Figure 1:
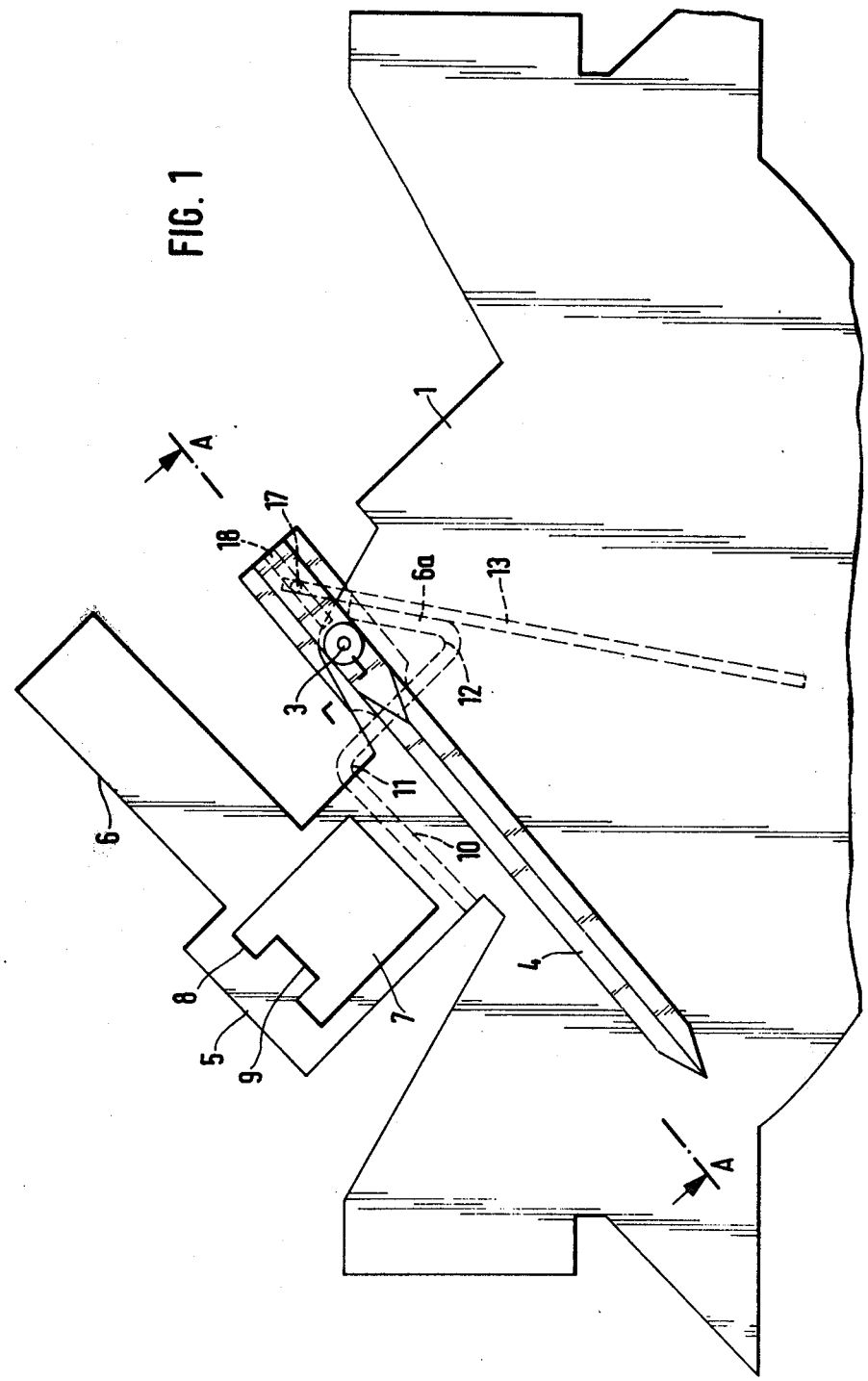

United States Patent [19]

Skopil

[11] 4,188,827
[45] Feb. 19, 1980

[54] BI-METALLIC INDICATOR

[75] Inventor: Arthur Skopil, Frankfurt am Main, Fed. Rep. of Germany

[73] Assignee: VDO Adolf Schindling AG, Frankfurt am Main, Fed. Rep. of Germany

[21] Appl. No.: 914,275

[22] Filed: Jun. 9, 1978

[30] Foreign Application Priority Data

Jun. 10, 1977 [DE] Fed. Rep. of Germany ....... 2726224

[51] Int. Cl.² ............................................. G01K 5/70
[52] U.S. Cl. ..................................... 73/363.5; 73/1 F; 219/512
[58] Field of Search ................. 73/363.5, 1 F; 29/407

[56] References Cited

U.S. PATENT DOCUMENTS

| | | | |
|---|---|---|---|
| 2,873,329 | 2/1959 | Swenson | 73/1 F |
| 3,015,951 | 1/1962 | Ochs, Jr. | 116/136.5 X |
| 3,040,580 | 6/1962 | Stover et al. | 73/363.5 |
| 3,078,717 | 2/1963 | Howard | 73/363.5 |
| 3,145,339 | 8/1964 | Gardner et al. | 116/136.5 |
| 3,670,280 | 6/1972 | Nagele | 73/363.5 |
| 3,946,614 | 3/1976 | Martin | 73/363.5 X |

*Primary Examiner*—Daniel M. Yasich
*Attorney, Agent, or Firm*—Martin A. Farber

[57] ABSTRACT

A bi-metallic indicator with a scale disc or plate, on which a pointer is rotatably mounted, as well as with a bi-metallic element which is arranged spaced apart from the side of the scale disc facing away from the pointer, the bi-metallic element being articulated on one end of the pointer. A section of the bi-metallic element is secured to the scale disc, without a base plate.

10 Claims, 2 Drawing Figures

BI-METALLIC INDICATOR

The invention relates to a bi-metallic indicator with a scale disc or plate, on which disc a pointer is rotatably mounted, as well as with a bi-metallic element which is arranged spaced apart relative to that side of the scale disc facing away from the pointer, and the bi-metallic element being articulated or coupled to one end of the pointer.

With such a known bi-metallic indicator, a base plate is provided spaced apart relative to the scale disc on its rear side, the bi-metallic element being fastened to the base plate. The pointer is coupled on a leg of the bi-metallic element by means of a lever element, the pointer being mounted outside of or beyond the scale disc. For the adjustment or setting, the bi-metallic element is displaceably and rotatably arranged on the base plate, and indeed in toothed holes in which the bi-metallic element is adjustable with special tools. This known bi-metallic indicator device requires a considerable expenditure in production, since the indicator consists of a plurality of individual parts which are to be produced in separate manufacturing operations, which parts must be carefully assembled or mounted. The calibration of the device by means of adjustment or regulation of the bi-metallic element with a special tool is rendered particularly expensive.

For reduction of the manufacturing expense it has already been proposed to mount the pointer directly on the scale disc, and indeed by means of a pin which is secured to the scale disc. However also here the bi-metallic element is mounted on a separate base plate and is connected with the pointer by means of lever elements. With respect to the adjustment or setting expense, thus also the same disadvantages exist as with the previously stated, known bi-metallic indicator device.

Consequently the present invention is based on the object to provide a bi-metallic indicator device of the introductory-named type while avoiding the mentioned disadvantages, characterized by a low manufacturing cost. Consequently the bi-metallic indicator device also is to be used for control purposes, for which it previously was too costly.

This task is aided in its solution starting out from a bi-metallic indicator device of the introductory-mentioned type, in the manner that a section (leg 13, for example) of the bi-metallic element (14) is secured to the scale disc (1), with the elimination of a heretofore required base plate.

By this construction of the bi-metallic indicator device without a base plate, the production expenses are considerably reduced, since not only the base plate itself, but rather also the connection elements between the base plate and the remaining components of the indicator device, particularly with the scale disc, are not necessary and are done away with. Moreover beyond that, this construction offers a condition for the fact that the bi-metallic element with members coupling to the pointer can be held particularly simple. Apart from this, this construction may be executed particularly compact and strong or robust.

An advantageous further formation of the bi-metallic indicator includes the feature that the bi-metallic element (14) is attached to a tongue (6), the latter being connected with the scale disc (1). The tongue, whose wide side is oriented perpendicularly relative to the rear side of the scale disc, makes a particularly secure and reliable connection of one end of the bi-metallic element (14) with the scale disc (1).

In a particular advantageous manufacturing manner the tongue forms an integral one-piece unit with the scale disc. Consequently a separate manufacturing step is avoided and done away with, which step otherwise would be for securing the tongue to the scale disc.

In a particularly advantageous manufacturing manner, the bi-metallic indicator device is provided with the features that the tongue (6) is formed with a tab (5), which tab changes or turns into the scale disc (1), that the tab (5) is bent at a right angle relative to the rear side of the scale disc, that the tongue (6) is bent perpendicularly laterally to the tab on an edge (11) therebetween, the latter edge changes or transfers into the tab (5), so that the tongue is held at a distance spaced apart and parallel to the scale disc, and that the tongue has a V-shaped bend spaced at a distance to this edge (11). With this one-piece formation of the scale disc with the fastening elements for the bi-metallic element, in a small costly manner, at first in a preferably single stamping operation, one planar sheet or sheet metal part is to be stamped, corresponding to the shape of the scale disc and of the tab with the tongue, the tongue being provided for the securing of the bi-metallic element. After the subsequent bending operations in which the tab is bent rear-sided relative to the scale disc and the tongue is bent around at a right angle in addition to this and is provided with a V-shaped bend, the scale disc is ready for reception of the bi-metallic element.

A particular advantage beside the cost advantageous production is achieved with a further formation of the bi-metallic indicator device, characterized by the features, that a substantially or approximately rectangular opening (7) is stamped out from the tab 5, and that from the edge (8) of the opening, which edge is remote from the scale disc, a rectangular-shaped projection (9) projects into the opening (7). With this formation of the tab, on the edge with the rectangular shaped projection, for calibration or adjustment of the completed bi-metallic indicator, a screw-driver can be inserted, in order to achieve the desired adjustment of the pointer on the scale disc by means of slight turning or twisting of the tab with the tongue. This adjustment or calibration operation can thus be produced very simply and with little time expenditure and does not require any special tool.

The complete bi-metallic indicator device moreover has the advantage of a simple coupling of the moveable end of the bi-metallic element with the pointer. In addition it has the feature, that an end (leg 15) of the bi-metallic element (14), which end is not fastened to the tongue (6), is coupled with the pointer (4) by means of a pin (17) and that the pointer in addition to this has a slot (18) on an end thereof, the latter embracing or surrounding U-shaped around the scale disc, with the pin (17) projecting in the slot (18), the pin (17) being secured to the bi-metallic element.

Figure 2:
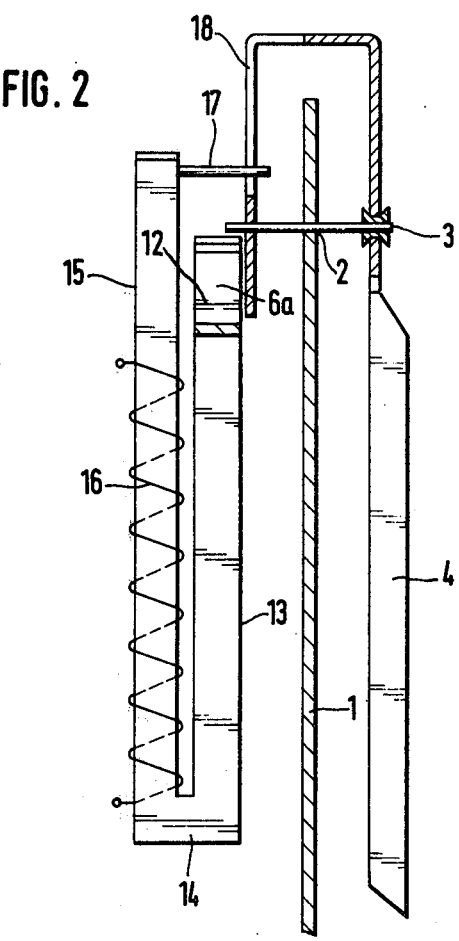

With the above and other objects and advantages in view, the present invention will become more clearly understood in connection with the following detailed description of a preferred embodiment, when considered with the accompanying drawings, of which:

FIG. 1 is a top plan view of the scale disc in two manufacturing phases of the bi-metallic indicator in accordance with the present invention, broken away in part; and FIG. 2 is a cross-section through the bi-metallic indicator taken along the lines A—A in FIG. 1.

Referring now to the drawings, the scale disc or dial plate is indicated with the numeral 1, whereby in FIG. 1 the lower part (here not of interest) is broken away. Approximately in the center of the upper edge, the scale disc has an opening 2 for securing a pivot pin 3 therein, which pin 3 serves for mounting a pointer 4 thereon.

From the structure of the upper edge in FIG. 1, in the present interrelationship or combination, the section indicated with a continuous solid line at the upper left is of significance. The continuous solid line is associated with the first manufacturing step of the scale disc. The part 5 of the scale disc constitutes a tab which projects from the remaining scale disc, which tab passes or extends laterally into a rectangularly-shaped tongue 6. The tab 5 has a larger width in comparison to the tongue 6, and in its interior has a stamped-out hole 7, from the edge 8 of which, a rectangularly-shaped projection 9 projects into the opening.

With a dashed line FIG. 1 illustrates how the tab 5 and the tongue 6 are bent in a second manufacturing phase. From this it may be seen that the tab is bent rearwardly relative the plane of the drawing along the edge 10. The tongue 6 is also bent downwardly, perpendicularly thereto about, and forming, the edge 11. Finally the tongue 6 is formed into a V-shaped bend about and forming the edge 12 in the second manufacturing phase. Thereby as FIG. 2 shows the tongue 6 is then located at a distance spaced from the scale disc 1, and the free end 6a of the tongue is spaced away from the opening 2 of the scale disc 1 such that the free end 6a does not lie in the axial extension of the opening 2.

As further seen in FIG. 2, on the free, V-shaped bent-around end 6a of the tongue 6, there is fastened a first leg 13 of a bi-metallic element 14, the second leg 15 of which is provided with a heating coil 16 therearound.

For coupling of the pointer 4 with the leg 15 of the bi-metallic element, a pin 17 is fastened on the free end of this leg, which pin projects into a longitudinal slot 18 in the lower section of the U-shaped pointer 4, the latter being bent about the edge of the scale disc 1.

If the bi-metallic pointer device corresponding to FIG. 2, and according to the dashed line of the tab 5 and the tongue 6, is finished in FIG. 1, the calibration or adjustment can be performed in the manner that a screwdriver is set in the hole 7 on the projection 9, in order to turn the tab 5 with the tongue 6 until the desired adjustment or calibration point of the pointer relative to the scale disc is achieved.

In operation of the bi-metallic pointer device, the force which is produced by the bi-metallic element 14 on the one hand acts via the tongue 6 and the tab 5 directly on the scale disc, and on the other hand by means of the pin 17 acts on the pointer 4 via the longitudinal slot 18 to move the pointer relative to the scale disc.

I claim:

1. A bi-metallic indicator comprising
a scale plate,
a pointer being rotatably mounted on said scale plate on one side thereof,
a bi-metallic element being arranged spaced apart from the other side of said scale plate, said other side facing away from said pointer,
said bi-metallic element being operatively coupled to said pointer,
a tab forming an integral part of said scale plate,
said tab includes a tongue,
said bi-metallic element has a section secured to said tongue,
said bi-metallic element has an end which is not fastened to said tongue,
a pin means is secured to said bi-metallic element for coupling said end of said bi-metallic element with said pointer,
said pointer is formed with a slot on an end of said pointer, said end of said pointer is shaped U-shaped around said scale plate,
said pin means projects into said slot,
said end of said bi-metallic element constitutes and end portion of a first leg of said bi-metallic element, said pin means is connected to said end portion of said first leg,
said bi-metallic element has a second leg, said second leg has a second end portion constituting said section, secured to said tongue,
said first and said second legs are connected forming said bi-metallic element in a U-shape,
said scale plate is formed with an opening,
a pivot pin extends through said opening,
said pointer is pivotally mounted on said pivot pin,
said tongue has a free end spaced away from an imaginary axial extension of said opening,
said scale plate has an edge,
said end of said pointer forms a U-shaped portion extending over said edge of said scale plate defining two portions adjacent said one side constituting a front side and said other side constituting a rear side of said scale plate, respectively,
said pivot pin is pivotally connected to said pointer at said two portions of said pointer.

2. A bi-metallic indicator comprising
a scale plate,
a pointer being rotatably mounted on said scale plate on one side thereof,
a bi-metallic element being arranged spaced apart from the other side of said scale plate, said other side facing away from said pointer,
said bi-metallic element being operatively coupled to said pointer,
a tab forming an integral one-piece unit with said scale plate,
said bi-metallic element having a section secured to said tab,
said tab including a tongue formed out of said tab,
said section of said bi-metallic element being attached to said tongue,
said tab extends from said scale plate,
said tab is bent substantially perpendicularly relative to said other side of said scale plate constituting a rear side thereof,
said tongue is bent substantially perpendicularly laterally relative to said tab on an edge of the tab, said edge extending between said tongue and a portion of said tab,
said tongue is held spaced apart and parallel to said scale plate,
said tongue has a V-shaped bend spaced from said edge.

3. The bi-metallic indicator as set forth in claim 2, wherein
said tab is formed with a substantially rectangular stamped out opening,
said tab has an edge of said opening, said edge includes an edge portion furthest away from said scale plate, said tab has a rectangularly-shaped projection which projects from said edge portion into said opening.

4. A bi-metallic indicator comprising a scale plate, a pointer being rotatably mounted on said scale plate on one side thereof constituting a front side, so as to move in front of said front side of said scale plate, a bi-metallic element being arranged spaced apart from the other side of said scale plate, said other side constituting a rear side thereof, said bi-metallic element having two end sections, one of said sections being operatively coupled to said pointer, a tab forming an integral part of said scale plate and extending rearwardly from the front side of said scale plate, the other end section of said bi-metallic element being attached to said tab.

5. The bi-metallic indicator as set forth in claim 4, wherein said tab includes a tongue formed thereon, and said other end section of said bi-metallic element is attached to said tongue.

6. The bi-metallic indicator as set forth in claim 4, wherein a pin means is secured to said one end section of said bi-metallic element for coupling said bi-metallic element with said pointer, said pointer is formed with a slot on an end of said pointer, said end of said pointer surrounds U-shaped around said scale plate, said pin means projects into said slot.

7. The bi-metallic indicator as set forth in claim 6, wherein said one end section of said bi-metallic element constitutes an end portion of a first leg of said bi-metallic element, said pin means is connected to said end portion of said first leg, said bi-metallic element has a second leg, said second leg has a second end portion constituting said other end section, secured to said tongue, said first and said second legs are connected forming a U-shape of said bi-metallic element.

8. The bi-metallic indicator as set forth in claim 6, wherein said scale plate is formed with an opening, a pivot pin extends through said opening, said pointer is pivotally mounted on said pivot pin, said tab has a free end spaced away from an imaginary line along an axial extension of said opening.

9. The bi-metallic indicator as set forth in claim 8, wherein said scale plate has an edge, said end of said pointer forms a U-shaped portion extending over said edge of said scale plate defining two portions adjacent said front side and said rear side of said scale plate, respectively, said pivot pin is pivotally connected to said pointer at said two portions of said pointer.

10. The bi-metallic indicator as set forth in claim 4, wherein said tab is formed with a substantially rectangular stamped out opening, said tab has an edge of said opening, said edge includes an edge portion furthest away from said scale plate, said tab has a rectangularly-shaped projection which projects from said edge portion into said opening.

* * * * *